United States Patent [19]
Muth

[11] Patent Number: 5,101,700
[45] Date of Patent: Apr. 7, 1992

[54] ROTATABLE TOOL HEAD

[75] Inventor: Wolfgang Muth, Helmstadt-Bargen, Fed. Rep. of Germany

[73] Assignee: GTE Valenite Corporation, Troy, Mich.

[21] Appl. No.: 384,599

[22] Filed: Jul. 25, 1989

[51] Int. Cl.[5] .............................................. B23B 27/00
[52] U.S. Cl. ................................... 82/123; 82/131; 82/1.2
[58] Field of Search ............... 82/1.11, 1.2, 1.3, 1.4, 82/1.5, 123, 131, 159, 154, 155

[56] References Cited

U.S. PATENT DOCUMENTS

| | | | |
|---|---|---|---|
| 2,901,935 | 9/1959 | Keller et al. | 82/131 |
| 3,180,187 | 4/1965 | McFerren | 82/131 |
| 4,040,315 | 8/1977 | Bellingham | 82/131 |
| 4,599,769 | 7/1986 | Latzko et al. | 82/1.2 |
| 4,607,549 | 8/1986 | Krempel | 82/131 |
| 4,626,149 | 12/1986 | Holy et al. | 82/1.2 |

FOREIGN PATENT DOCUMENTS

| | | | |
|---|---|---|---|
| 44501 | 3/1986 | Japan | 82/123 |
| 1197785 | 12/1985 | U.S.S.R. | 82/131 |

Primary Examiner—Frederick R. Schmidt
Assistant Examiner—Blynn Shideler
Attorney, Agent, or Firm—Bill C. Panagos; Robert E. Walter

[57] ABSTRACT

A rotatable tool head for a machine tool includes a tool slide and a mass balancing counter slide which are radially displaceable in opposite directions. The counter slide is mounted in a central recess of the tool slide such that the mass centers of the tool slide and the counter slide move along substantially the same radial line during tool adjustments. In this manner unbalanced masses present in an arrangement where the slides are positioned in axial or radial adjacent relationship, are substantial eliminated.

6 Claims, 1 Drawing Sheet

U.S. Patent  Apr. 7, 1992  5,101,700
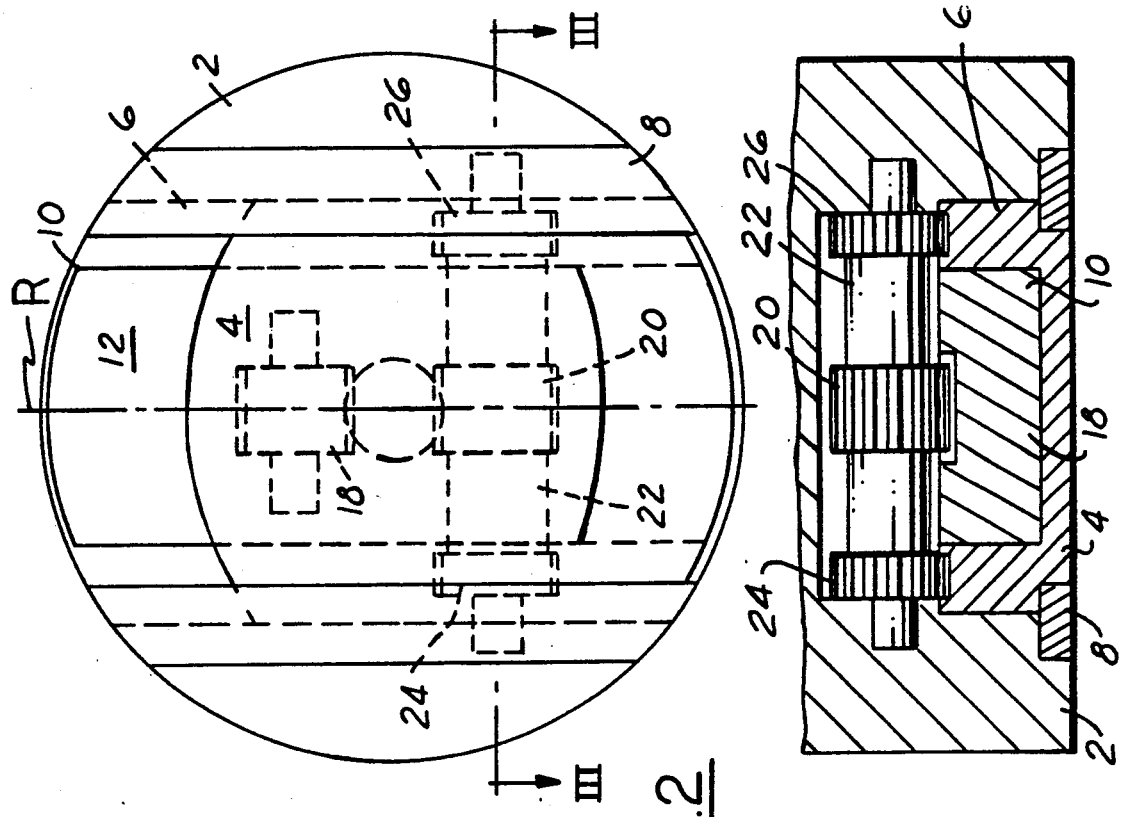
FIG.2
FIG.3
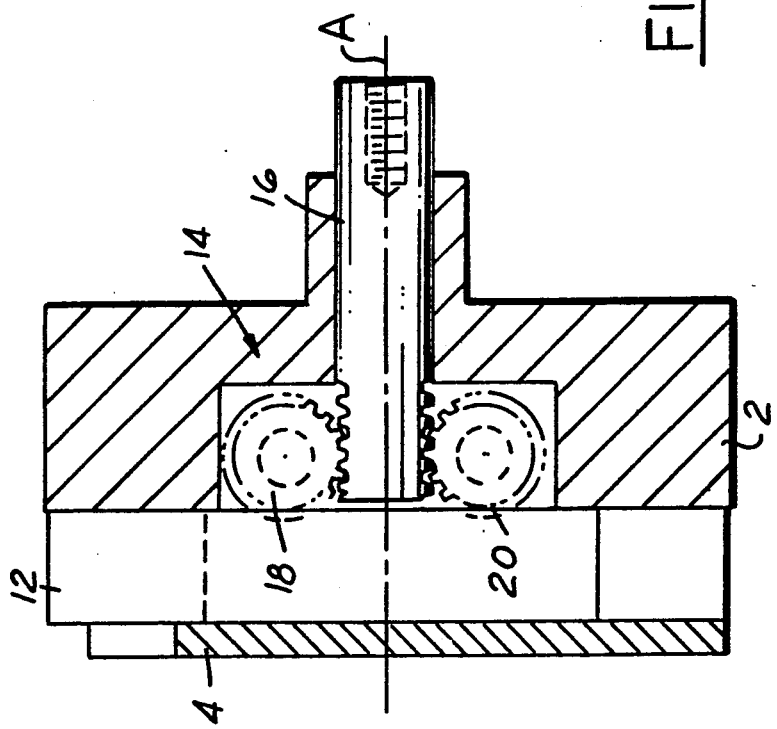
FIG.1

ROTATABLE TOOL HEAD

BACKGROUND OF THE INVENTION

The present invention relates to a rotatable tool head for a machine tool, including a base member mounted to a rotatable tool spindle for rotation therewith, a tool slide carrying a facing tool and slideably mounted in the base member so as to be lineally movable in a radial direction for tool adjustments, a counter slide arranged to be lineally movable in a direction opposite to the direction of movement of the tool slide for mass balancing, and actuating means for simultaneously displacing the tool slide and counter slide.

A rotatable facing tool head of this type has become known from German printed application 34 08 352. In this known tool head the tool slide and the mass balancing counter slide are arranged in axial adjacent relationship such that their mass centers move along radial lines axially spaced with respect to each other. When the tool head is rotating this arrangement provides for unbalanced masses causing "wobble" forces when the tool head is rotating.

U.S. Pat. No. 3,824,883 discloses a rotatable facing tool head having a pair of tool slides which are positioned adjacent to each other in the same radial plane such that the mass centers of the two tool slides move along radially spaced lines when the tool slides are displaced in opposite directions. Also, with this known rotatable tool head "wobble" forces are generated by unbalanced masses resulting from the radially adjacent arrangement of the tool slides.

It is a primary object of the present invention to provide a rotatable tool head having a tool slide and a counter slide arranged so that unbalanced masses are substantially eliminated.

According to the present invention a rotatable tool head of the above identified type is characterized in that the counter slide is slideably mounted in a central recess of the tool slide such that the mass centers of the tool slide and the counter slide move along substantially the same radial line during tool adjustments.

Accordingly the mass balancing counter slide is "integrated" within the tool slide by being mounted in the central recess of the tool slide. When both slides are simultaneously displaced in opposite directions, their mass centers move along substantially the same radial line intersecting the axes of the tool shaft. Due to this arrangement there are substantially no unbalanced masses, and no "wobble" forces exist.

The actuating means for displacing the slides may comprise a tooth gearing or any other mechanical or hydraulic mechanism.

A preferred embodiment of the invention will be explained with reference to the accompanying drawings wherein FIG. 1 is a schematic axial section of a rotatable tool head;

FIG. 2 is an end view of the rotatable tool head as shown in FIG. 1;

FIG. 3 is a section through the tool head along line III—III in FIG. 2.

DETAILED DESCRIPTION OF THE EMBODIMENT

The rotatable facing tool head shown in the drawing comprises a base member 2 which is mounted to a tool spindle (not shown) to be rotatable therewith about an axis A. Base member 2 is provided at its front face opposite to the tool spindle with a recess 6 of rectangular cross section. A tool slide 4 which carries a cutting tool (not shown) is slideably mounted in recess 6 and retained therein by ledges 8.

Tool slide 4 is provided with a radially extending central recess 10 which is opened toward the inner side of the tool head facing the tool spindle.

A mass balancing counter slide 12 is slideably mounted in recess 10 for radial movements. Recess 10 and counter slide 12 are of substantially the same rectangular cross section so that recess 10 matingly receives counter slide 12. The arrangement is such that the mass centers of tool slide 4 and counter slide 12 are substantially on the same radial line (see FIG. 2).

Actuating means 14 are provided to simultaneously displace tool slide 4 and counter slide 12 in opposite directions at the same radial rate. In the embodiment shown the actuating means 14 comprise a toothed gearing.

The toothed gearing comprises a gear rack 16 positioned to be concentric to the axis A of the tool spindle and adapted to be axially reciprocated by a drive (not shown).

Gear rack 16 on one side engages a pinion 18 and on the other side engages a pinion 20 so that pinions 18 and 20 are rotated in opposite directions when gear rack 16 is axially reciprocated.

Pinion 18 which is rotatably mounted in base member 2 is in direct engagment with a toothing of counter slide 12 provided at a face of counter slide 12 facing the tool spindle. Pinion 20 is nonrotatably mounted to a shaft 22 which is rotatably mounted in base member 2 and carries pinions 24 and 26 at its opposite axial ends. Pinions 24 and 26 are in direct engagement with toothings at surfaces of tool slide 4 facing the tool spindle, on opposite sides of counter slide 12.

Tool slide 4 is made from steel and counter slide 12 from heavy metal.

In operation gear rack 16 is axially displaced by the drive (not shown), e.g. towards the left in FIG. 1 in order to radially displace the cutting tool (not shown). As a result pinion 18 rotates clockwise and pinion 12 rotates counter clockwise in FIG. 1. Pinion 20 displaces tool slide 4 downwards (in FIGS. 1 and 2) via shaft 22 and pinions 24, 26, while pinion 18 simultaneously displaces counter slide 12 upwards (in FIGS. 1 and 2) at the same radial rate. During such movements the mass centers of tool slide 4 and counter slide 12 move along substantially the same radial line R so that no "wobble" forces caused by unbalanced masses exist.

I claim:

1. A rotatable tool head for a machine tool, comprising:
    (a) a base member mounted to a rotatable tool spindle for rotation therewith,
    (b) a tool slide carrying a facing tool and slideably mounted in the base member so as so be lineably moveable in a radial direction for tool adjustments,
    (c) a counter slide arranged to be lineably moveable in a direction opposite to the direction of movement of the tool slide for mass balancing,
    (d) actuating means for simultaneously displacing the tool slide and counter slide, said actuating means comprising a toothed gear rack positioned to be concentric to the axis of rotation of the tool spindle and adapted to be axially reciprocated by a drive, (e) a first and second pinion on opposite sides of the gear rack and engaging the gear rack so that the pinions are rotated in opposite directions when the gear rack is axially reciprocated, whereby the counter slide is slideably mounted in a central recess of the tool slide such that the mass centers of the tool slide and the counter slide move along substantially the same radial line during tool adjustments.

2. A rotatable tool head as claimed in claim 1, wherein the recess of the tool slide is of a rectangular cross section and the counter slide is of a corresponding cross section.

3. A rotatable tool head as claimed in claim 2, wherein the tool slide is mounted adjacent a front face of the rotatable tool head, said recess of the tool slide is open towards the interior of the tool head, and the actuating means are arranged to engage surfaces of the tool slide and counter slide facing towards the interior of the tool head.

4. A rotatable tool head as claimed in claim 1, wherein said pinion for causing displacements of the counter slide is in direct engagement with the latter.

5. A rotatable tool head as claimed in claim 4, wherein said pinion for causing displacements of the tool slide is mounted on a shaft for rotation therewith, which shaft is adapted to drive a pair of pinions in direct engagement with the tool slide.

6. A rotatable tool head as claimed in claim 1, wherein the tool slide is made from steel and the counter slide is made from heavy metal.

* * * * *